B. A. BRIGDEN & G. C. KEHRES.
CAMERA.
APPLICATION FILED JUNE 7, 1916.
1,248,607.
Patented Dec. 4, 1917.
3 SHEETS—SHEET 1.
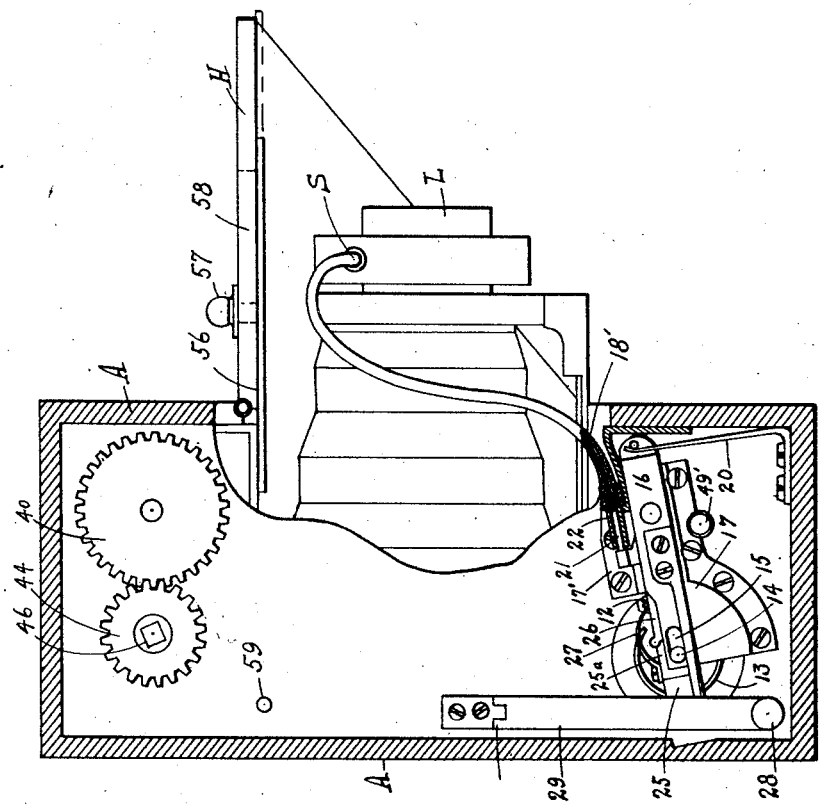
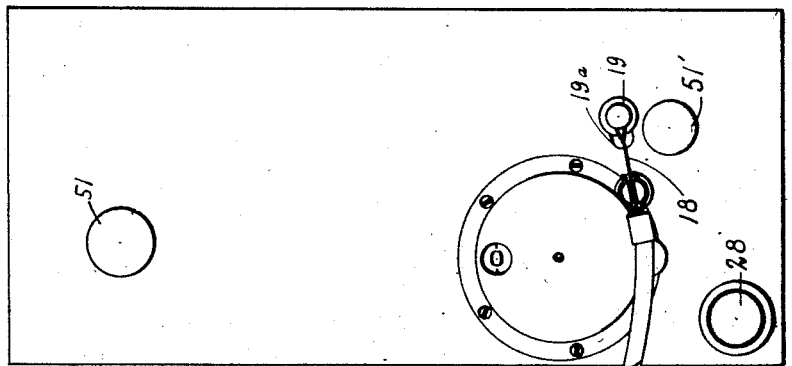
WITNESSES:
INVENTORS
ATTORNEY B. A. BRIGDEN & G. C. KEHRES.
CAMERA.
APPLICATION FILED JUNE 7, 1916.
1,248,607.
Patented Dec. 4, 1917.
3 SHEETS—SHEET 2.
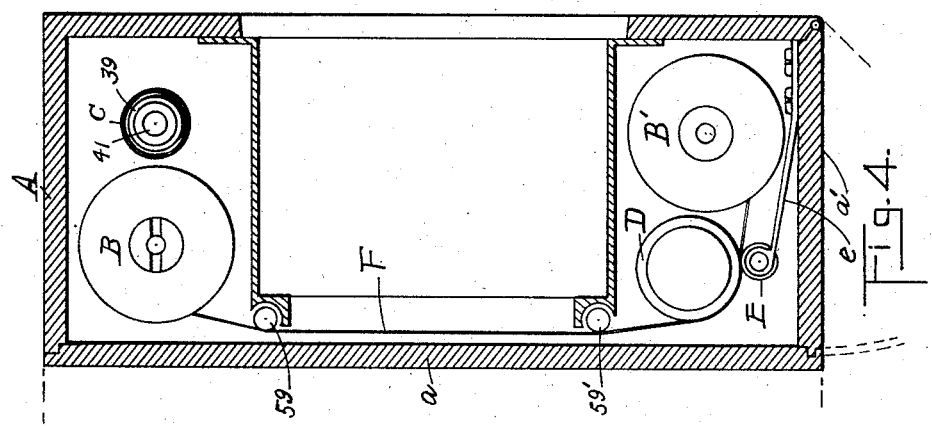
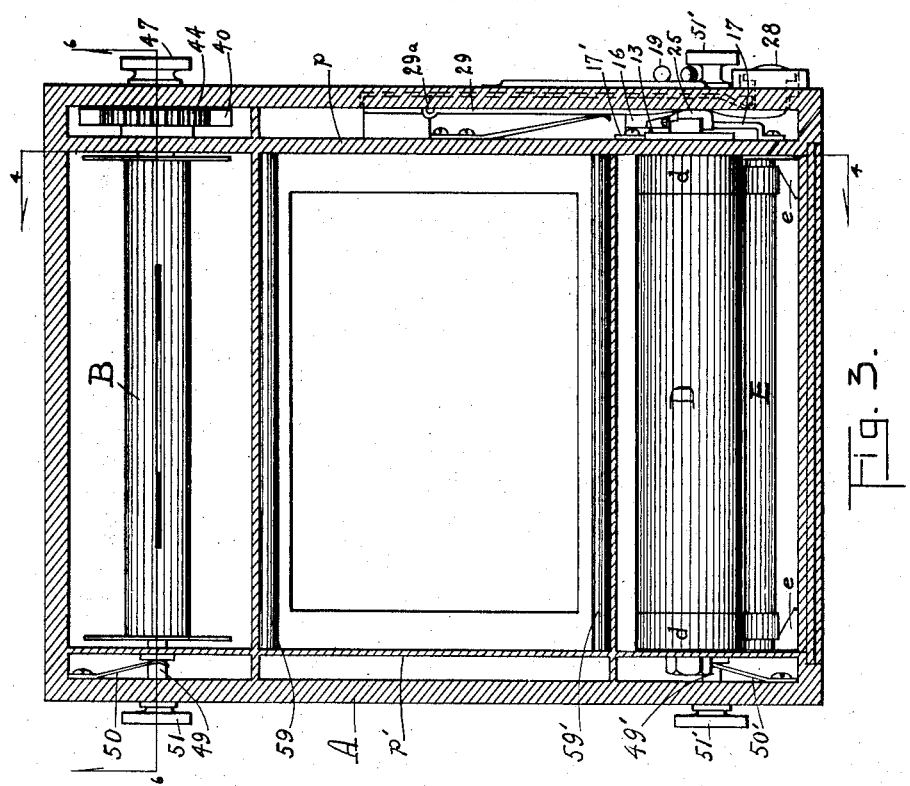
WITNESSES:
Amelia F. Seaber.
Harry A. Thompson
INVENTORS
Burt A. Brigden
Gustav C. Kehres
BY John A. Bommhardt
ATTORNEY

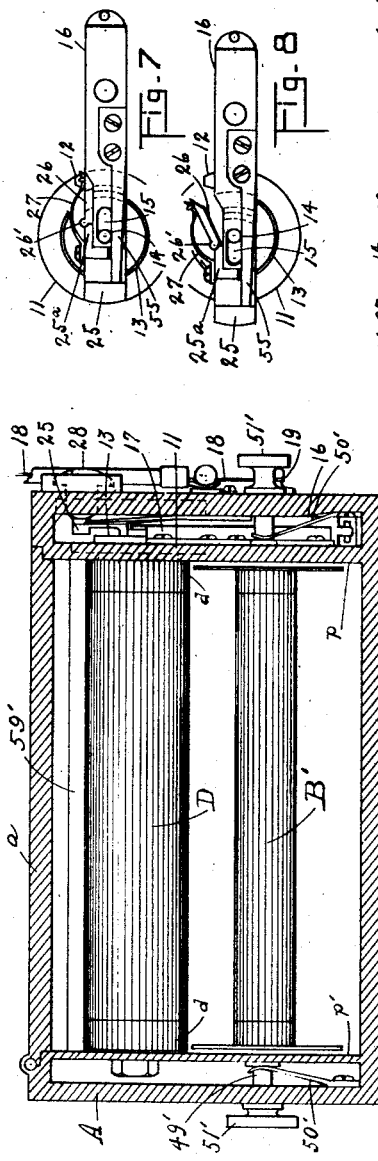
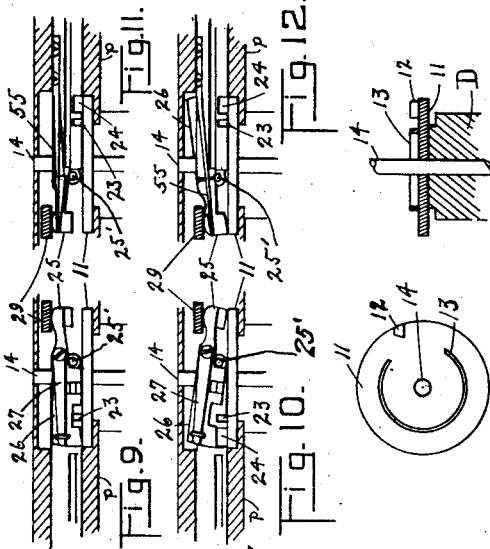
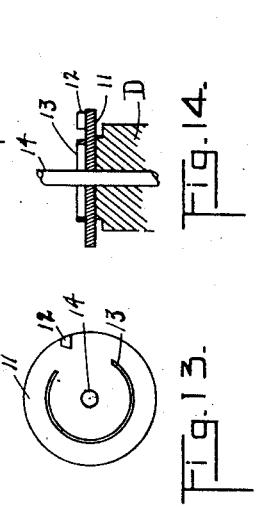
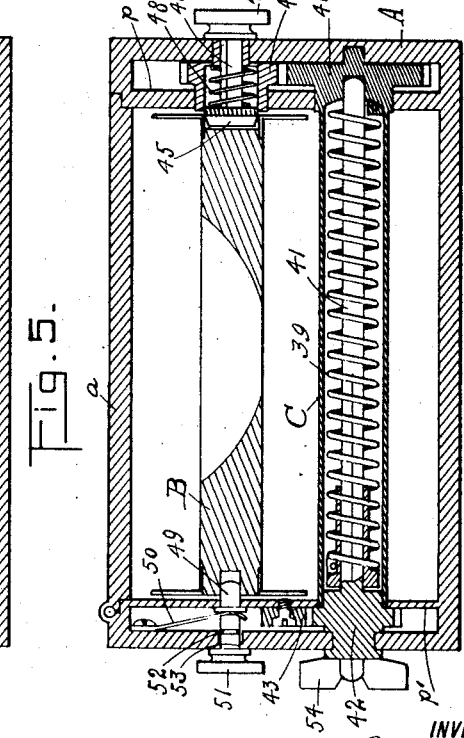

UNITED STATES PATENT OFFICE.

BURT A. BRIGDEN AND GUSTAV C. KEHRES, OF CLEVELAND, OHIO.

CAMERA.

1,248,607.  Specification of Letters Patent.  Patented Dec. 4, 1917.

Application filed June 7, 1916. Serial No. 102,234.

*To all whom it may concern:*

Be it known that we, BURT A. BRIGDEN and GUSTAV C. KEHRES, citizens of the United States, residing at Cleveland, in the county of Cuyahoga and State of Ohio, have invented certain new and useful Improvements in Cameras, of which the following is a specification.

This invention relates to roll holding cameras, and its main object is to provide a camera of that type with means for rapidly repeating exposures, and also means for preventing the possibility of "double exposure". Under certain conditions, the time required for resetting the shutter and advancing the film of ordinary cameras of this type is objectional, as it is often desirable to take a number of pictures in rapid succession, or by taking a number of pictures to record a particular incident or action, which latter is often a matter of difficulty as with a single exposure, it requires an exact timing of the exposure, to the action.

To accomplish the result indicated, the present invention provides improved means for operating the shutter and advancing the film by a single operation, the operations being automatic and capable of rapid repetition. Therefore the shutter operating device is connected to an escapement which controls the film feed, and, after the shutter is operated, the escapement acts to permit another length of film to be unwound, ready for the next operation. The successive exposures may thus be practically as rapid as a photographer can operate the mechanism, approaching, in this respect, the speed of a motion picture apparatus. The escapement acts, as a stop to limit the feed of the film at each operation, preliminary to another operation of the shutter. The film is advanced by a spring, at each release.

One embodiment of the invention is illustrated in the accompanying drawings, in which:

Figure 1 is a side elevation of the camera.

Fig. 2 is a side elevation with the side casing removed showing connection of escapement and lens shutter.

Fig. 3 is a rear elevation with the back of the casing removed.

Fig. 4 is a section on the line 4—4 of Fig. 3.

Fig. 5 is a bottom view, with the bottom of the casing removed.

Fig. 6 is a section on the line 6—6 of Fig. 3.

Figs. 7 to 12 are details of the escapement in different positions.

Fig. 13 is a plan of escapement disk.

Fig. 14 is a section of the same.

Referring specifically to the drawings, A indicates the camera casing, and $a$ and $a'$ are hinged covers to permit loading and unloading. B is a film winding spool for receiving the exposed film. B' is the supply spool. C is a spring tension roller which operates the roller B and the film, and D is a regulating roller, which coöperates with the escapement for controlling the movement of the film to the exposure position. E is a contact roller pressed against roller D by springs $e$, and the ends of the roller D have friction surfaces $d$ to secure a firm grip of the film F.

The spring barrel C incloses a spiral spring 39 fixed at one end to a gear 40 and at the other end to the shaft 41, which has one bearing in a socket on the inner side of the gear 40 and is fixed at the other end to a ratchet wheel 42 which has a bearing in the outer casing and a winding key 54 on the outside thereof. The ratchet 42 coöperates with a pawl 43 pivoted to a partition plate $p'$ to prevent backslip. The gear 40 meshes with a gear 44 which drives the winding spool B when the key 45 is inserted in the usual slot in the end of the ordinary film spool. The key 45 is attached to a square pin 46 which has longitudinal movement in a square hole in the gear 44, and may be operated by means of a knob 47. The inner side of the gear 44 is bored out to receive the base of the key 45 when it is withdrawn from the slot in the spool, to remove the spool of exposed film. Between the key 45 and the gear 44 is a small spiral spring 48 which normally holds the key in the slot. The other end of the spool B revolves on a pin 49 held in position by the spring 50, and the pin may be withdrawn by pulling out on the knob 51. When the pin is free of the spool the crowding force of the spring 50 forces the grooves 52, in the pin, over a thin bearing edge 53 at the outer surface of the casing, which is sufficient to prevent the return of the pin until started by pressing the knob 51. The ends of the spool B' are held by similar devices, 49' to 51', as shown in Fig. 5.

H indicates a swinging hood, L the lens mount, and S the shutter, of ordinary or suitable construction. On one end of the roller D is mounted a circular metal disk 11 (Fig. 14), which revolves in a recess in the partition $p$ at that end of the casing. This disk has, on its outer face, a lug 12, at the outer edge thereof, and a ring flange 13 of lesser radius, a segment of the ring 13 being removed or omitted to form an opening. The shaft 14 of the roller D extends through a longitudinal slot 15 in a sliding escapement bar 16, and, further, through the end of the casing. The bar 16 moves between flanges or guide plates 17 and 17', the edges of which project into longitudinal grooves in the escapement bar, the plates being fixed to the partition $p$. The bar 16 is operated by the ordinary wire release 18, pulling on a knob 19 which is connected to the bar 16 through a slot 19ª in the casing, against the tension of a spring 20 connected to the front end of the bar. The movement of the bar 16 is limited by the length of the slot 15 and is equal to the width of the lug 12. The bar 16 has a small rod 21 attached to the top thereof, which rod slides in a fixed tube 22 and is attached to the wire 18 of an ordinary shutter release, the wire extending to the shutter, as shown in Fig. 2.

The bar 16, has in its inner side, curved channels 23 and 24 of the same radius as the lug 12 and the ring 13, and of sufficient width to permit the passage of this lug and ring when the bar is in normal position, and when the bar is shifted, to operate the lens shutter, it acts to prevent any turn or movement of the roller D. It will be understood that the tension of the film tends to advance the film and turn the roller when permitted by the escapement.

At its rear end the bar 16 is provided with a lever 25 pivoted to the bar at 25' and forming, in effect, a continuation of said bar. This lever has a forward extension 25ª set into the top of the bar 16 and ending in a detent or trap 26 hinged thereto at 26' and adapted to open upwardly.

This detent or trap normally covers the channel 24 through which the lug 12 escapes. A spring 27 tends to lift the leaf or trap 26 away from the bar 16, but when the release device is idle the pressure of the lug 12 against the leaf 26 causes it to be depressed against the bar 16, and cover the channel, but when the bar 16 is pulled back by the wire 18 the leaf 26, moving with the bar, withdraws from under the lug 12, and, then, the spring 27 opens the leaf 26, as shown in Fig. 8.

In the operation of the parts thus described, assuming that an exposure is to be made, the escapement bar 16 is pulled back by the wire 18, to the extent permitted by the slot 15. This operates the shutter by the pull of the wire 18, also the detent 26 will have been withdrawn from under the lug 12, and opens as shown in Fig. 8, and on the release of the wire 18 the spring 20 returns the bar 16 to its ordinary position, the lug 12 enters under the open detent and into the channel 24 and escapes through the said channel, turning with the roller D in consequence of the pull on the film. At the same time ring 13 enters the channel 23 and thereby locks the bar 16 against movement until the roller D has completed its revolution and the film has been properly advanced. When the roller completes its revolution the lug 12 strikes the detent 26 and shuts it against the bar 16, as shown in Fig. 7, thereby stopping the turn of the roller D and consequently the advance of the film. At that time, also, the bar 16 occupies the space between the ends of the segmental ring 13; hence it is unlocked for the next operation. The circumference of the roller D must be equal to the required movement of the film.

It is desirable or necessary to provide means for advancing the film without operating the shutter, as after loading. For this purpose the lever 25 is provided and may be operated by the following device: 28 is a button, exposed through the casing, on a lever 29 which is pivoted at 29ª and which bears against the rear end of the lever 25. When the button is pushed in the lever 25 is swung on its pivot 25' and this swings the leaf 26 laterally or outwardly, as shown in Fig. 10, thereby releasing the lug 12 at the side of the detent 26 and allowing it to escape through the channel 24 and make a half revolution until it is stopped by the rear end of the lever 25 which is so positioned that when swung in it will stand in the path of the lug 12. Then, by releasing the button 28, the spring 55 swings the lever 25 outwardly, releasing the lug 12 which completes its revolution until it is stopped by the detent 26 and the bar 16 as above described. When placing a fresh roll of film in position, this operation may be rapidly repeated until the film is advanced to the proper position for the first exposure.

Associated with the parts above described is an exposure indicator which need not be described, and which is reserved for another application.

A fresh spool of film is loaded into the camera in the usual way excepting that before the cover $a'$, which carries the spring roller E, is closed against the leader strip of paper the latter is drawn out until a marked place is correctly located against the regulating roller D, and then cover $a'$ is closed, thus blocking further movement of the paper leader. The part withdrawn is then wound up taut on the spool B by turning the winding key 54 of the spring roller C. When taut the tension of the rollers D and E prevents turning of the spool B and the connected gears, but the desired spring tension in the roller C may be secured by further winding of the key, back movement being prevented by the pawl 43, and the shaft 41 turning free in the gear 40.

It will be noticed that the controlling roll D is located between the supply roll B' and the exposure opening (see Fig. 4), or in other words at the side of the exposure opening opposite the winding roll B, which is spring-actuated. This is important, because it maintains a flat film at the exposure opening caused by the tension on the film between the winding roll and the controlling roll, the film being under the spring tension both when it is moving and when it is stopped, and has the advantage that it requires no brake on the supply roll nor other means to prevent a flabby film at the focal plane.

What we claim as new is:

1. In a roll film camera having an exposure opening, the combination with a supply spool and a spring-actuated winding spool for the film, said spools being located at opposite sides of the exposure opening, of a controlling roll over which the film passes at the opposite side of the exposure opening from the winding spool, an escapement device governing the rotation of the controlling roll, and means to operate said escapement device.

2. In a roll film camera, having an exposure opening, the combination with a supply spool, and a spring-actuated winding spool for the film, said winding spool being located at one side of the exposure opening, of a controlling roll actuated by the film and over which the film passes between said spools, said roll being located on the opposite side of the exposure opening from the winding spool, an escapement device governing the rotation of the controlling roll, and means to operate said escapement device.

3. In a roll film camera, the combination with a supply spool and a spring-actuated winding spool for the film, of a controlling roll over which the film passes between said spools, an escapement device governing the rotation of the controlling roll, means to operate said escapement device, and a shutter operatively connected to said escapement device and actuated thereby.

4. In a roll film camera, having an exposure opening, the combination with winding roll, located at one side of the exposure opening and tending to advance the film, of a controlling roll, engaging the film on the opposite side of the exposure opening from the winding roll and adapted to normally prevent advance of the film, a movable escapement device engaging the controlling roll to prevent rotation thereof, and means to operate the escapement device to permit such rotation.

5. In a roll film camera, the combination with winding means tending to advance the film, of a controlling roll engaging the film before it reaches said winding means and adapted to normally prevent advance thereof, a movable escapement device engaging the controlling roll to prevent rotation thereof, means to operate the escapement device to permit such rotation, and means to prevent operation of the escapement device while said roll is rotating.

6. In a roll film camera, having an exposure opening, the combination with a winding roll located at one side of the exposure opening and tending to advance the film, of a controlling roll over which the film passes on the opposite side of the exposure opening from the winding roll and adapted to normally prevent said advance, said roll having a projection, and a shiftable escapement bar normally engaging said projection to prevent rotation of the roll.

7. In a roll film camera, the combination with means tending to advance the film, of a controlling roll over which the film passes and adapted to normally prevent said advance, said roll having a projection, and a shiftable escapement bar normally engaging said projection to prevent rotation of the roll, said bar having a channel through which the projection may pass when the bar is shifted to one position.

8. In a roll film camera, the combination with means tending to advance the film, of a controlling roll over which the film passes and adapted to normally prevent said advance, said roll having a projection, a shiftable escapement bar normally engaging said projection to prevent rotation of the roll, a shutter, and an operating connection between the escapement bar and the shutter, adapted to operate the shutter when the bar is shifted one way, the bar acting to release the roll when it is shifted the other way.

9. In a roll film camera, having an exposure opening, the combination with a winding spool located at one side of the exposure opening and tending to advance the film, of a controlling roll over which the film passes on the opposite side of the exposure opening from the winding spool, the circumference of said controlling roll being substantially equal in length to each picture space of the film, said roll acting to normally prevent movement of the film, an escapement device controlling the rotation of the roll, and operable to permit a single rotation of the roll, at each operation, and means to operate the escapement device.

10. In a roll film camera, having an exposure opening, the combination with a winding spool located at one side of the exposure opening and tending to advance the film, of a controlling roll over which the film passes on the opposite side of the exposure opening from the winding spool, the circumference of said roll being substantially equal in length to each picture space of the film, said roll acting to normally prevent movement of the film, an escapement device controlling the rotation of the roll, and operable to permit a single rotation of the roll at each operation, means to operate the escapement device, a shutter, and an operating connection between the shutter and the escapement device.

11. In a roll film camera, the combination with means tending to advance the film, of a controlling roll having a lug and a segmental flange at one end, a sliding escapement bar having channels through which the lug and flange may pass when the bar is moved to one position, said flange engaging said bar to prevent movement of the latter while the roll is rotating.

12. In a roll film camera, the combination with means tending to advance the film, of a controlling roll over which the film passes, said roll having a projecting lug, a shifting escapement bar having a channel through which the lug may pass, a detent mounted on the bar and adapted to close said channel and form a stop for the lug, said detent being movable to uncover the channel when the bar is shifted, and means to operate the bar.

13. In a roll film camera, the combination with means tending to advance the film, of a controlling roll over which the film passes and adapted to prevent said advance, said roll having a projecting lug at the end, a shiftable escapement bar located adjacent the end of the roll, a detent carried by the escapement bar and resting normally in the path of the lug to form a stop preventing rotation of the roll, a spring connected to the detent and acting to move the same out of the path of the lug when the bar is shifted in one direction, and a spring connected to the bar and tending to shift the same in the other direction, to restore the detent to the stop position.

14. In a roll film camera, the combination with means tending to advance the film, of a controlling roller over which the film passes, a sliding escapement bar having means to permit a single rotation of the roll at each operation, a shutter, a connection between the bar and the shutter, means to shift the bar in one direction to operate the shutter, and means to shift the bar in the other direction to release the roll and permit said rotation.

15. In a roll film camera, the combination with means tending to advance the film, of a controlling roll over which the film passes, said roll having a lug, a shiftable escapement bar having a detent normally engaging the lug to prevent rotation of the roll, means to shift said bar to release the detent from the lug, a shutter, a connection between the bar and the shutter to operate the latter when the former is shifted, and a manually operated device to release the detent without shifting the bar, whereby the roll may be released without operating the shutter.

16. In a roll film camera, the combination with means tending to advance the film, of a controlling roll having a lug at the end, a shutter, an escapement bar extending across the end of the roll, an operating connection between the bar and the shutter, a detent flexibly connected to the bar and normally engaged by the lug to prevent rotation of the roll, means to shift the bar and the detent in one direction to release the lug and permit rotation of the roll, and independent means to shift the detent in another direction, to release the lug, whereby rotation of the roll may be permitted without movement of the bar.

17. In a roll film camera, the combination with means tending to advance the film, of a controlling roll over which the film passes, said roll having a lug at the end, a shutter, an escapement bar operatively connected to the shutter, a lever pivoted to the escapement bar, a detent pivoted to the lever and normally located in the path of the lug to prevent rotation of the roll, means to shift the bar and withdraw the detent in one direction from the path of the lug, and a finger lever engageable with the said lever and adapted to operate the latter and withdraw the detent from the path of the lug independent of the movement of the bar.

18. In a roll film camera, the combination with means tending to advance the film, of a controlling roller having a lug and a segmental flange at one end thereof, an escapement bar extending across the end of the roll and having channels through which the lug and flange may pass, a detent leaf hinged to the bar and adapted to close the channel through which the lug passes, said leaf being located in the path of the lug when the bar is in one position, a spring connected to the leaf and acting to open the same when the bar is shifted to another position, means to shift the bar to the last mentioned position, and a spring connected to the bar and acting to return the same to original position.

19. In a roll film camera, having an exposure opening, the combination of a spring-actuated winding roll, a supply roll at one side of the exposure opening, a controlling roll over which the film passes between said rolls, said controlling roll being located between the supply roll and the exposure opening, a pressure roll holding the film against the controlling roll, and an escapement mechanism governing the release of the controlling roll.

In testimony whereof, we do affix our signatures in presence of two witnesses.

BURT A. BRIGDEN.
GUSTAV C. KEHRES.

Witnesses:
JOHN A. BOMMHARDT,
A. A. BEMIS.